(12) United States Patent
Burnett

(10) Patent No.: US 6,704,404 B1
(45) Date of Patent: Mar. 9, 2004

(54) CALLBACK TELECOMMUNICATION SYSTEM AND METHOD

(75) Inventor: John Geoffrey Robert Wildman Burnett, Cambridge (GB)

(73) Assignee: Netcall PLC, Birmingham (GB)

( * ) Notice: Subject to any disclaimer, the term of this patent is extended or adjusted under 35 U.S.C. 154(b) by 381 days.

(21) Appl. No.: 09/614,063

(22) Filed: Jul. 11, 2000

(30) Foreign Application Priority Data

Jun. 23, 2000 (GB) .............................................. 0015357

(51) Int. Cl.[7] .................................................. H04M 3/42
(52) U.S. Cl. .............................. 379/209.01; 379/265.01
(58) Field of Search ....................... 379/265.01–265.14, 379/266.01–266.1, 209.01, 369, 210.01

(56) References Cited

U.S. PATENT DOCUMENTS

| | | | |
|---|---|---|---|
| 5,155,761 A | 10/1992 | Hammond | 379/67 |
| 5,282,243 A | 1/1994 | Dabbaghi et al. | 379/201 |
| 5,559,878 A | 9/1996 | Keys et al. | 379/265 |
| 5,627,884 A | 5/1997 | Williams et al. | |
| 5,774,534 A * | 6/1998 | Mayer | 379/142 |
| 5,835,568 A | 11/1998 | Bass et al. | |
| 6,002,760 A | 12/1999 | Gisby | 379/266 |
| 6,259,786 B1 * | 7/2001 | Gisby | 379/266 |
| 6,263,066 B1 * | 7/2001 | Shtivelman et al. | 379/266 |

FOREIGN PATENT DOCUMENTS

| | | |
|---|---|---|
| WO | WO 92/01350 | 1/1992 |
| WO | WO 97/24860 | 7/1997 |

* cited by examiner

Primary Examiner—William J. Deane, Jr.
(74) Attorney, Agent, or Firm—Townsend and Townsend and Crew LLP

(57) ABSTRACT

A system and method for call-back handling are described. A call from a caller to a client, is received and the number at which the caller can be called back is determined. The call-back handler then initiates a telephone call to the client through a public service telephone network standard line, either locally or on a public telephone network, and waits for the client to accept the call. Then, the caller is called and the calls from call-back handler to client and to the caller are connected.

31 Claims, 8 Drawing Sheets

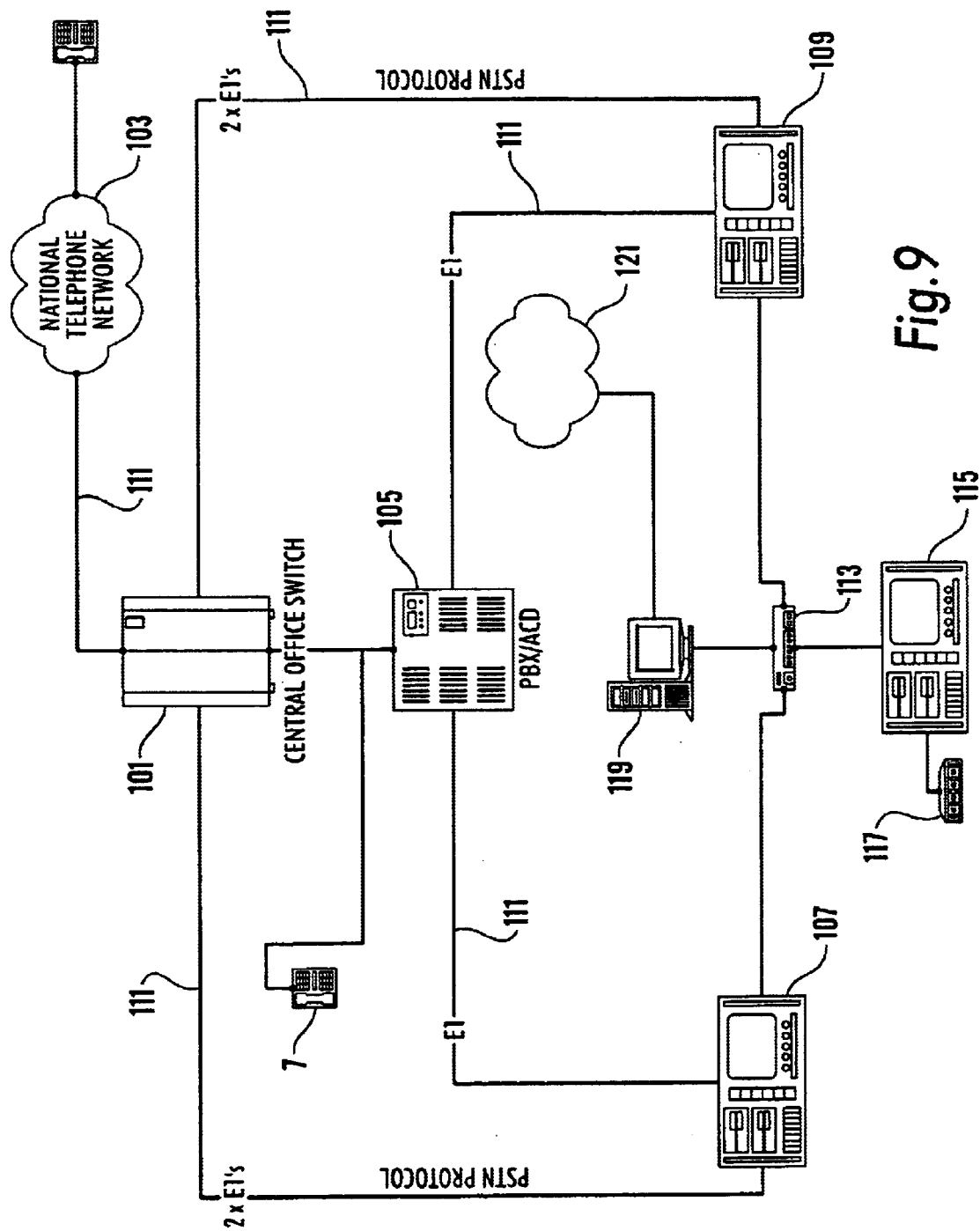

US 6,704,404 B1

CALLBACK TELECOMMUNICATION SYSTEM AND METHOD

FIELD OF THE INVENTION

The invention relates to a call-back telecommunication system and a method for using it and in particular to a call-back system which does not requite integration into a telephone switch and a method of using such a system.

BACKGROUND OF THE INVENTION

Individuals are increasingly mobile and many are becoming harder to reach at their place of employment. Furthermore, businesses are frequently unwilling to employ sufficient staff in business groups such as sales or support to deal with the number of calls at peak periods, only to have the same staff idle at slack periods. However, if it becomes too difficult for callers to reach individuals or business groups, the callers may become discouraged. Such discouraged callers may represent lost sales opportunities or disgruntled customers.

One way of addressing this problem is to record the caller's telephone number and to call back the caller at some later time. Receptionists have being doing this for many years, but more recently automatic equipment for this purpose has been described in a number of patents relating to call centre operations. To put the disclosure of these patents in context call centre operation and the systems described in these patents will now be described. However, it should be emphasised that all businesses need systems for dealing with incoming calls, and call-back functionality might be useful to any business, not just in call centres.

A steadily increasing number of businesses are using call-centres to deal with telephone queries from customers. Many banks, financial institutions and insurance companies use such call-centres, but call-centres are not restricted to such uses and call-centres may also be suitable for dealing with customer sales queries or support queries an any of a large number of businesses.

A typical call-centre has a telephone switch which receives calls from the external telephone networks and an automatic call distribution (ACD) system which carries out a number of functions, such as routing each incoming call, intercepting digital information from the incoming call and monitoring call progress. A number of agents are connected to the switch and generally sit at terminals having a voice telephone, a computer screen and a computer input means such as a keyboard and/or a mouse.

Incoming callers are either connected directly to an agent at a terminal, if an agent is free, or held in a queue commonly arranged inside the ACD until an agent becomes free.

However, callers to a call centre frequently object to being held in a queue and can become irate or hang up if they have to wait too long. Those customers may then call a competitor, or simply not call back. Furthermore, if the callers become irate over the length of time they have to wait this makes it difficult for the agent to expeditiously deal with the incoming caller when the agent finally becomes available.

Ideally, sufficient agents would be used to deal with all incoming calls but in most call-centre operations there are very large peaks and troughs in demand. For example, if the call-centre is dealing with telephone orders for products, an advertisement transmitted on the television or radio can markedly increase the number of callers to the call-centre.

Also, callers typically bunch at certain times of day. For example, many call-centres experience peaks in calls between 9.00 am and 11.00 am after customers have arrived at work, and also at around 6.30 pm, when the customers return home. It would be economically unfeasible to employ sufficient agents to deal with these peaks and troughs in demand.

To deal with this problem, which is particularly apparent in call centres, the possibility of automatic call-back has been proposed. One such call-back system is described in U.S. Pat. No. 6,002,760 to Gisby. In this system, there is a single queue initiated by customers calling the call-centre. However, the identity of the caller is automatically determined, or inputted by the caller, to allow the caller to hang up while waiting in the queue. Then, when the caller nears or arrives at the front of the queue, an out-dialler dials the original caller back to connect that caller with an agent The call queue thus combines both callers that are still on hold and callers who have had their identity determined so that they can he called back.

Another call-back system is described in U.S. Pat. No. 5,155,761 to Hammond. In this system a robot controller is connected to the telephone switch for handling a call-back queue with a time controller and for calling back a caller when an agent becomes free. When the call-back succeeds, the caller is connected to an agent. Another similar system is described in U.S. Pat. No. 5,559,878 to Keys et al.

However, prior art systems have a significant disadvantage in that they require dedicated hardware to handle the calls. The hardware described must cause a switch to connect callers to agent and such dedicated hardware will in general only be able to interface with a very limited selection of switches. Indeed, such hardware is likely only to be particularly suitable for installation in new call-centres or as part of a replacement switch for a call centre. They are thus only suitable for a very small part of the possible market for call-back functionality.

Furthermore, since many businesses rely on their switches, exchanges or call-centres for their business, they require absolute reliability and dependability and are reluctant to change the switch or interfere with its operation just to add call-back functionality An alternative solution to some of the problems identified above is described in U.S. Pat. No. 5,282,243 in which calls are diverted to a processor which simply stores the CLI/ANI information, for later access by the called business. However, the absence of automatic call-back is a significant inconvenience.

Accordingly, there is a need for an improved call-back method and/or system that can be more easily integrated with existing equipment, whether in call cenures or elsewhere, and that can deal with a wide variety of equipment.

SUMMARY OF THE INVENTION

According to a first aspect of the invention, there is provided a call-back method. Firstly, a call-back handler receives a call from a caller to a client, and determines a number at which the caller can be called back. In due course, the call-back handler initiates a telephone call to the client. A telephone call from the call-back handler to the original caller is made and the original caller is connected to the client in the call-back handler so that the connection between caller and client is routed through the call-back handler.

The call to the client may be made on a telephone standard line, for example a line that uses conventional public switched telephone network (PSTN) standards. By using these standards to connect the call-back handler to the client it becomes much easier to integrate the call-back handler in a variety of situations. Of course, such standards may change in the future or be different in different regions or markets and any appropriate standard may be used.

In embodiments of the invention the call-back handler will initiate a telephone call to the client by transmitting a dial signal to a switch so that the switch can read the dial signal and connect the call to the client in a known manner, or more accurately expressed the call is connected to telephone apparatus at the client. The switch may be a public exchange or private exchange, for example a private branch exchange (PBX).

The term "client" is used in this specification to refer to the called party, and not to imply any contractual relationship between any of the parties.

A preferred embodiment of the invention provides a call-back handler for handling calls made by a caller to a client. The call-back handler includes a caller identification system for recording the identity of the caller, and a telephone standard out-dialler for dialling out using telephone standard codes. The call-back handler includes code for causing the out-dialler to call the client and to wait for the client to answer the call, and for causing the out-dialler to dial the caller when the client answers the call. The handler also contains a switch for connecting the client with the caller so that the call from the client to the caller is connected through the call-back handler.

In the approach of the prior patents described above, control signals have to pass between the call-back handler and a switch and this in turn requires the prior art call-back handlers to be integrated in a switch and pass control signals to the switch. The control signals in the prior art are presumably sent using computer telephony integration (CTI) signals.

In the method and apparatus according to the invention the call between client and caller can be routed directly through the call-back handler, rather than requiring the call-back handler to control the switch to connect the agent to the caller through the switch.

The call-back handler of the invention only requires a telephone connection to a client, who does not even have to have a switch let alone integrate call-back functionality into the switch.

The ease of integration into existing operations of the call-back handler according to the invention may allow more rapid installation of call-back functionality, sufficiently quickly to meet the rapidly changing demands of businesses.

Preferably the call-back handler dials out to both the client and to the original caller using digital signals of the type used to connect digital local switches to a central office switch but the out-dialler may instead use the tones or pulses used to connect conventional handsets to local switches.

Embodiments of the call-back method and apparatus according to the invention may call the client, the called party, before calling the original party back. The prior call-back systems described above have generally called the caller back before connecting the caller to an agent, to maximise agent resource. U.S. Pat. Nos. 6,002,760 and 5,155,761 are of this type. Alternatively, the system may display on an agent terminal information whilst connecting to the caller; U.S. Pat. No. 5,559,878 is of the latter type. In either case the call-back handler must be integrated in the switch in order that information as to whether an agent is free is available. In contrast, the invention may function without direct information about whether the client is available; instead the client is first called via the telephone standard connection and then if and only if the client accepts the call is the original caller called back and connected to the client. However, embodiments of the invention may incorporate a data connection between client and call-back handler, as will be mentioned below.

In one arrangement, the call-back handler may be configured to deal with all telephone calls dialled to a particular number.

The provision of a separate call-back handler that need only be connected by telephone lines to the client allows a call-back service to be provided by a third-party call-back service provider that is separate, both spatially and in terms of ownership, from the call centre or other user. The call centre or other user need not install additional equipment, and can hire the call-back service only when need arises, for example when dealing with planned peaks in demand. The calls to the client can be delivered on the public telephone network.

The call back handler may be directly connected to a central office switch rather than to a PBX exchange or to an ACD. The central office switch is a switch one level higher than the local PBX of an individual business; the PBXs of many local businesses are connected to a central office switch. In the prior systems discussed above, when the business switch is overloaded callers simply get the engaged tone and no information regarding them is available to the called business. In contrast, by installing a call-back handler connected one level higher in the telephone network the capability to deal with calls can be enhanced so the call-back handler will only become saturated at much higher levels of calls. The call-back handler may even be connected even more centrally, for example at a public telephone exchange or even a trunk exchange, to still further increase the call-handling capability.

As mentioned, the call-back handler may use public service telephone signals of the type used to connect a central office switch to local PBXs. These signals are, in many territories, digital signals rather than pulses or DTMF tones. The digital signals may carry additional information.

The call-back handler may be arranged locally of the client and dedicated public service telephone standard cabling provided between the call-back handler and the client's telephone, PBX, ACD or other switch. In contrast to a PBX which connects to individual telephones linked in an office building, the call-back handler according to the invention has a different functionality and dials the client, for example by transmitting dial signals to enable a local switch or public telephone exchange to route the call to the client.

The call-back handler may be arranged to deal with calls that are diverted from a switch because the switch is overloaded. Since many existing ACD systems and some conventional switches have a facility for diverting overflow calls to a pre-determined local extension or distant telephone number, a method and apparatus of handling diverted calls according to the invention can readily be integrated into such systems.

This approach allows a call-back service to be supplied by a third-party to a call-centre or other user to handle overflow calls.

The client may be simply an individual or may be a large company. The client may have a switch or ACD system with a number of extensions, or a single telephone.

The client's switch or ACD may incorporate a queuing system, so when the call-back system calls the switch back the call waits in the queue until an agent becomes available. In this way, an existing queuing system at the switch can be utilised.

The client may be a call centre with a number of agents, i.e. operators at a terminal. However, the invention also envisages that the calls may be connected to, for example, a computer system capable of handling data calls, or indeed any call-handling system, person, group of persons or combinations thereof. Moreover, although the term "agent" is used, which is a term commonly used in call centres, the invention is applicable to any user, including single individuals with a single telephone line, businesses with a PBX system as well as call-centres.

The call-back handler may be arranged to only place a pre-determined number of calls at one time with the client. This pre-determined number may vary with the time, depending on the number of agents available or the expected load.

To deal with calls that cannot be placed immediately with the client, the call-back handler may include a local queue for queuing those additional calls.

The call-back handler may also allow the caller to indicate a preferred call-back time, and use this information in determining when to place the call with the switch. The user may be offered a number of times to call back.

The call-back handler may further allow a caller to input a different number to be called back on than the number from which the caller is calling.

The call-back handler may include a network connection for receiving digital information from the client. The digital information can include information regarding the number of calls received and the number of agents free. The call-back handler may use this information to determine the number of call-backs to the client that the call-back handler should make

BRIEF DESCRIPTION OF THE DRAWINGS

For a better understanding of the invention, and purely by way of example, specific embodiments will now be described with reference to the accompanying drawings, in which

FIG. 9 shows an embodiment of a call-handler system according to the invention.

DETAILED DESCRIPTION

The invention relates, in general terms, to a call-back handler and method. For convenience, a general description of the method will be made first with reference to FIG. 1.

A call from a caller is received (Step 23) at the call-back handler. The call may be any kind of call, including, for example, a telephone voice call, a data call, or a facsimile call. The call may be received directly on the public telephone network, on a private network, or be redirected by a public or private switch to the call-back handler.

After the call is received, the telephone number of the caller is recorded (step 25). This may be done by any convenient method, for example by using caller line identification/automatic number identification (CLI/ANI). Alternatively, the caller may be asked to input his telephone number and the number recorded the caller may simply speak his telephone number which can be recorded. The caller is then able to hang up, possibly after having recording additional information if required, for example the caller's name, or a message from the caller 8. Alternatively or additionally, the call-back handler may record tone pulses, such as DTMF pulses, to allow the caller to input the call-back number on his telephone key-pad.

In due course, it will become time for the call-back handler to connect the caller to the client. This may be, for example, as soon as the client becomes available, or it may be at a time proposed by the caller.

The call-back handler will initiate the call by sending out some form of dial signal along a telephone line (step 27). The dial signals may be PSTN protocol signals or other signals as suitable locally. These dial signals will be interpreted by some form of switch, or a number of switches, to cause the call to be connected to the client, or more precisely telephone apparatus of the client. The switches connecting the call-back handler to the client telephone apparatus may be public exchanges or private PBX or ACD systems; indeed any switch with the capability to interpret dial signals and route the calls appropriately to the client may be employed. Such methods of routing telephone calls are conventional and will not be described further.

After the call-back handler calls the client back, in step 27, it then waits (step 29) for the client to answer the call, in a conventional manner depending on the type of telephone apparatus operated by the client. When this occurs, the call-back handler dials (31) the original caller directly and connects together (33) the calls to the client and to the caller whereby the caller is connected to the client (7).

Figure 2:
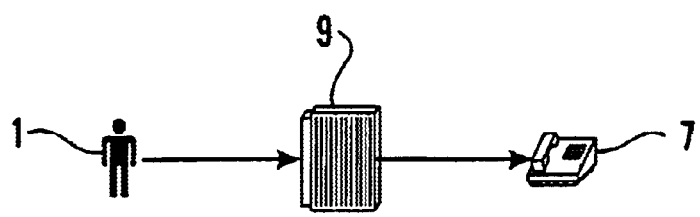
FIG. 2 is a diagram illustrating a call set up by the method of the invention.

FIG. 2 shows the link on the called back call between the caller 1, through the call-back handler 9 to the client 7. Note that although whether or not the original call from the caller 1 was to the client 7 or to the call-back handler on the call-back call the client is connected to the original caller via the call-back handler.

In some embodiments of the invention, the call-back handler will only receive calls when the client is unavailable. In particular, this will occur when the calls are diverted to the call-back handler by the client or exchange when the client cannot cope with all incoming calls.

However, in some embodiments the call-back handler receives calls even at times that the client can answer them. In this case, the method of the invention may include an additional step, illustrated in FIG. 3. The method is very similar to that illustrated in FIG. 1, and the description of the steps there will not be repeated.

Figure 1:
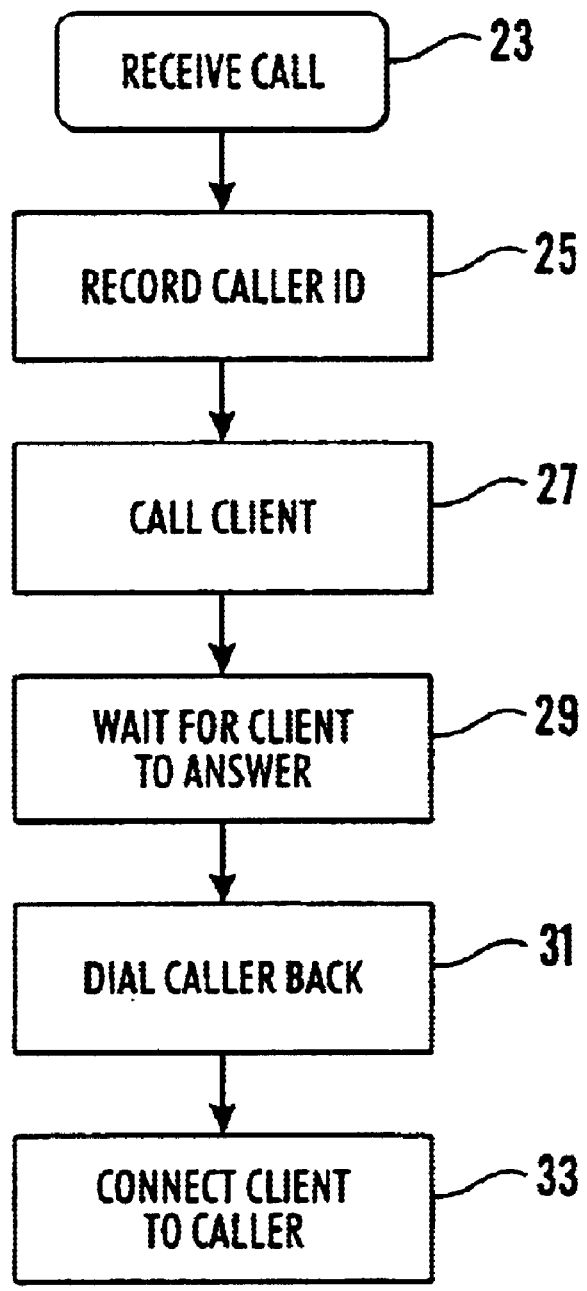
FIG. 1 is a schematic diagram illustrating a first general embodiment of a method according to the invention.
Figure 3:
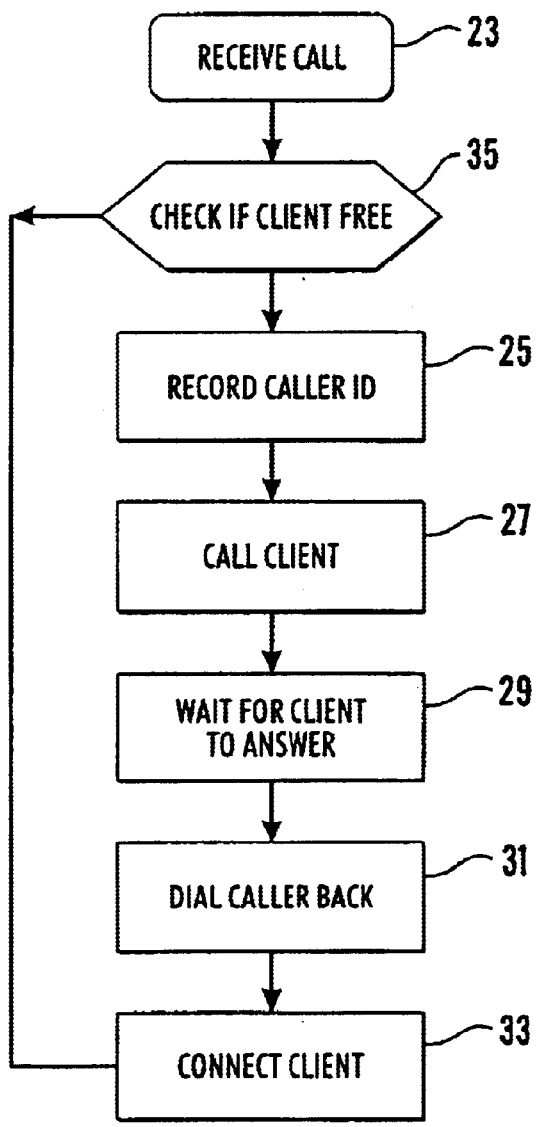
FIG. 3 is a diagram illustrating a second general embodiment of a method according the invention.

The difference between the method illustrated in FIG. 1 and that illustrated in FIG. 3 is after the call-back handler receives an incoming call for a client it first checks (step 35) whether the client is free to receive the call.

If the client is free to take the call, the client is directly connected to the caller through the call-back handler without the need for call back. Otherwise, call-back operation is started by recording the caller ID at step 25, and then continuing with other steps as already described.

Figure 4A:
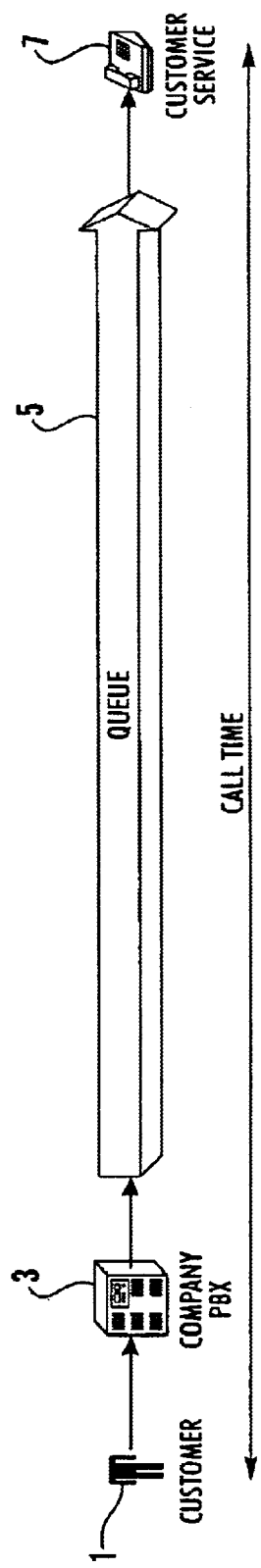
FIG. 4 is a schematic diagram comparing time-lines of methods according to FIGS. 1 and 3 with a conventional arrangement.
Figure 4B:
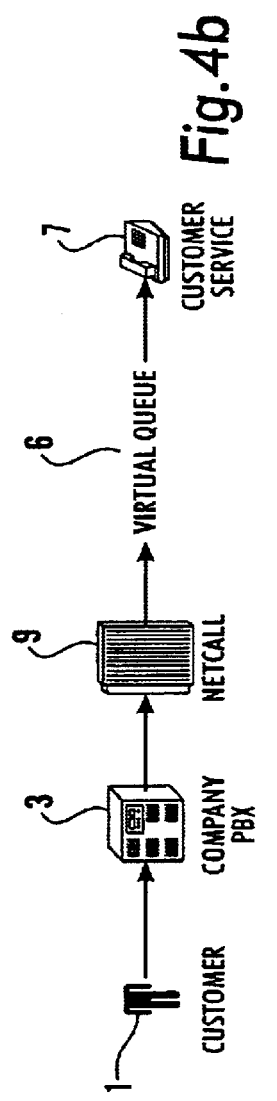
Figure 4C:
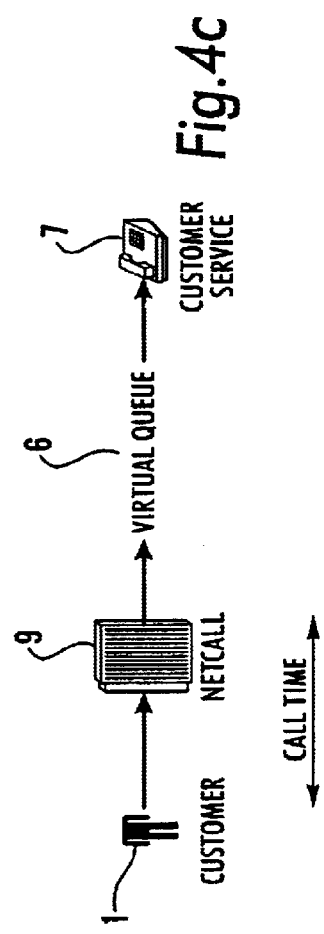

FIG. 4 is an overview comparing the present conventional process with the process according to the invention.

At present, as shown in FIG. 4a, a caller 1, for example a customer, dials the client switch 3. When nobody is immediately available to answer the call the switch causes the customer to wait in a queue 5. When the call can be answered, the caller is connected, for example to an agent in customer service.

FIG. 4b presents a timeline for a first type of operation according to the invention.

The caller 1 again calls the client switch 3. In this case, the switch 3 has the capability to divert incoming calls to the call-back handler when certain conditions occur. This may be due to factors such as agent terminals being unavailable, queuing time being excessive or other programmable parameters. It may be possible to provide such a divert at the exchange, even a public exchange, in which case the switch 3 represents the exchange.

Since the switch 3 only diverts overflow calls to the call-back handler 9 this type of operation will be referred to as "divert" operation in the following.

When the call-back handler receives the call it carries out the method described above with reference to FIG. 1, by recording the caller's details and then allowing the caller to hang up. At some later time, the call-back operation connects the original caller to the client.

An alternative to the "divert" method of operation is the "intercept all calls" operation schematically shown in FIG. 1c. In this case, the call-back handler deals with all calls, not just excess calls. Since the call-back handler may receive a call even at a time when the client can receive them, the call-back handler operates, for example, using the method discussed above with reference to FIG. 3 by first checking whether the call can be directly connected to the client.

Figure 5:
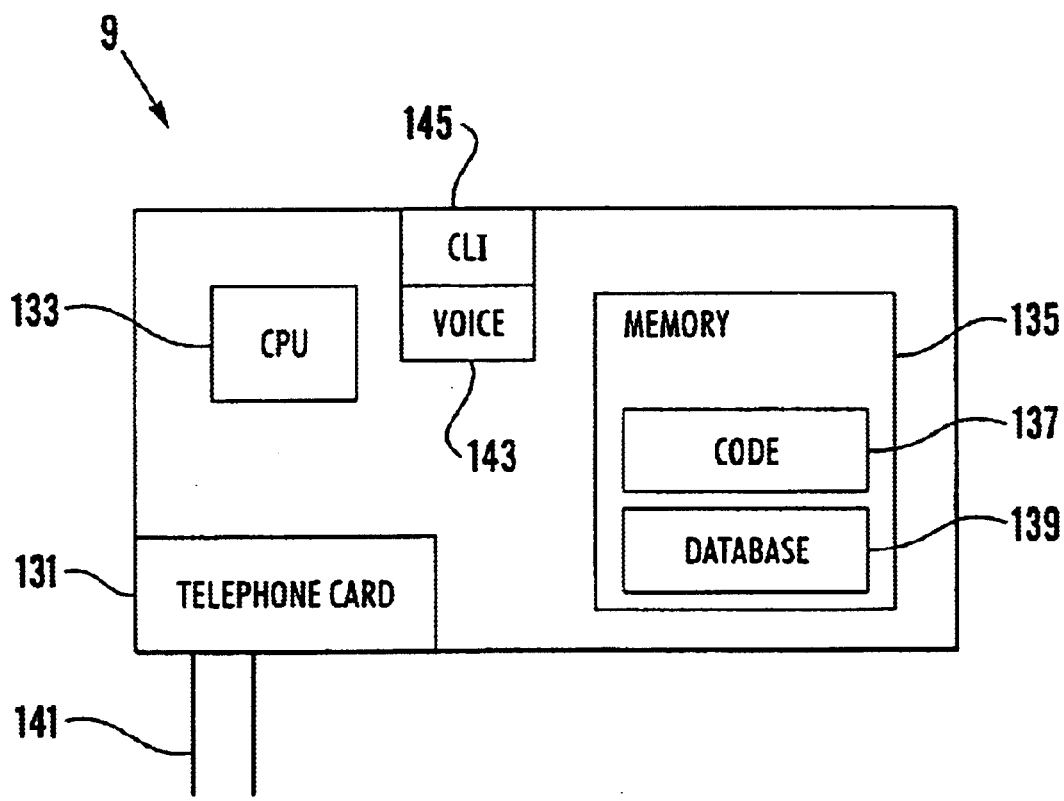
FIG. 5 is a schematic diagram of apparatus according to the invention suitable for implementing either the first or the second embodiment of the invention.

FIG. 5 shows a schematic diagram of an embodiment of a call-back handler for carrying out the above methods. The call-back handler includes a telephone card (131), a processor (133), and memory (135) storing program code (137) and a database (139). The program code allows the telephone card to be controlled to dial out using telephone standard, i.e. PSTN codes, on a telephone connections (141) connected to the telephone card (131). The card has the functionality to detect conventional telephone signals, such as busy or number unobtainable signals. The code causes the telephone card to act as an out-dialler to call the client and to wait for the client to answer the call, and code for causing the out-dialler to dial the caller when the client answers the call. The code also causes the telephone card (131) to act as a switch means for connecting the client with the caller so that the call from the client to the caller is connected through the call-back handler. The call-back handler also has, by means of the telephone card (131), the ability to detect CLI signals. Telephone cards with the required capability are commercially available.

The database (139) can store relevant data, including for example a list of clients to call back and the times they are to be called back; thus the database (139) may be considered to be a virtual queue.

A database may be provided in the call-back handler for storing various data. The database may include a virtual queue. The virtual queue may queue calls in the call-back handler before the call-back handler dials the switch.

The call-back handler may include an automatic caller identification system 145 for automatically detecting the caller line identity (CLI)/Automatic Number Identification (ANI).

The call-back handler may also include a voice call handler 143 for automatically dealing with voice calls. Such systems are commercially available with the ability to synthesise speech or replay recorded speech and to record responses. In embodiments, the voice call handler may be a separate unit from the rest of the call-back handler though it may often be more convenient to integrate the voice call handler into the call-back handler.

The call-back handler may also include ACD functionality to check the number dialled and route the number accordingly. For example, where the client is an individual the switch may transfer calls to the client's home, office, mobile telephone or other telephone number as appropriate. The ACD system may be linked to the internet to allow remote access by the client to update the information regarding the number to call. Incorporating such ACD functionality in the call-back handler is particularly useful where the client does not have such ACD functionality itself, but even where the client does have such ACD functionality it may be useful to use ACD at the call-back handler since this can result in one fewer link being required to connect the call.

Figure 6:
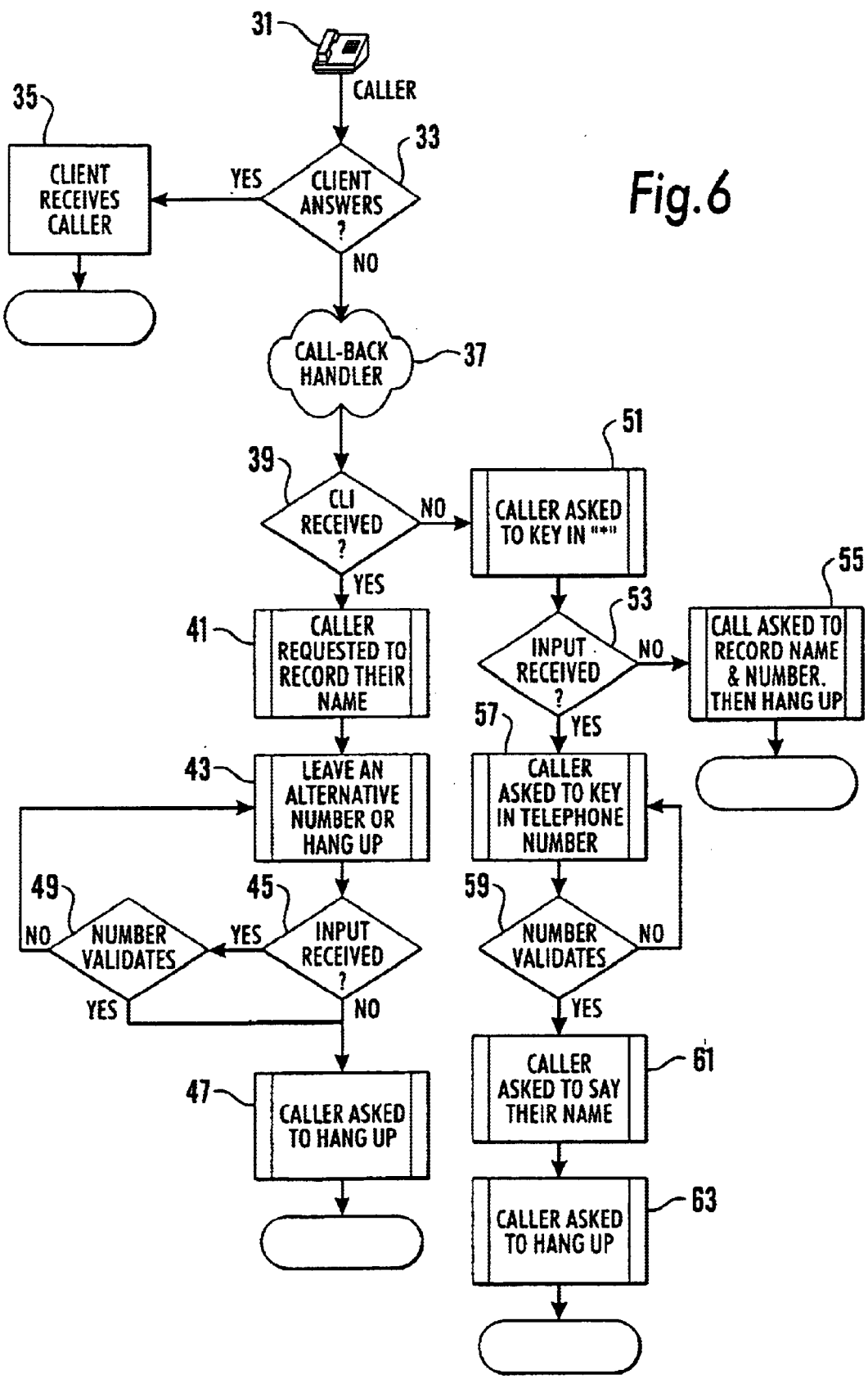
FIG. 6 is a flow diagram of a call-in method according to a specific embodiment of the invention.
Figure 7:
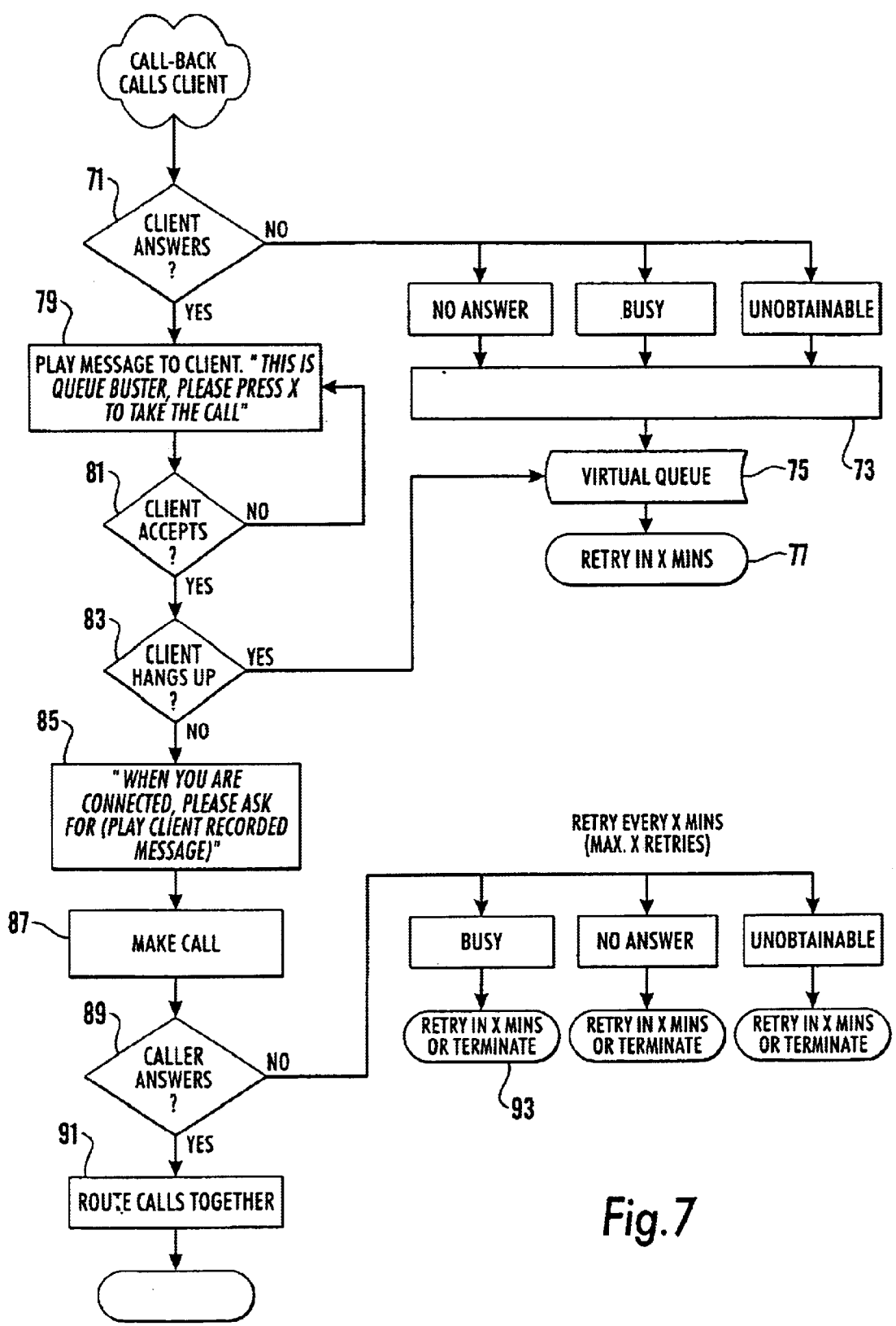
FIG. 7 is a flow diagram of a call-back process according to the embodiment of FIG. 6.

A more specific embodiment of the operation of the call-back handler in the "call divert" mode will now be presented with reference to FIGS. 6 and 7, which are flow diagrams of the call-in and call-back process respectively.

The caller calls (31) the client to start the process. The client determines (33) whether the client can handle the caller; if so the client receives (35) the caller and the process never reaches the call-back handler.

If on the other hand the client cannot or does not deal with the call, the call is diverted (37) by known means to the call-back handler.

When the call-back handler receives the call, it tests (39) whether a caller line identity (CLI) signal has been received. In some regions a like signal is known as automatic number indicator (ANI), and this or any other like signal providing information enabling the caller to be called backer may be used instead.

If the CLI signal is received, the caller is requested to record their name (41) which is stored together with the received CLI signal. The caller is then given the option (43) to give an alternative number or to hang up. A test is then carried out (45) to see if any input is received. If not, the caller is invited (47) to hang up.

If input is received it is validated (49); if the input is valid it is recorded and the caller is invited (47) to hang up. If the input is determined to be invalid, process control passes back to step (43) to invite the caller to give an alternative number or hang up.

If when the call is received CLI is not received then the caller is asked (51) to key "*". A test then determines (53) whether input is received; if not it is assumed that the caller is not using tone dialling (DTMF) and the caller is asked (55) to record his name and number and then hang up.

Assuming the "*" is detected, the caller is asked (57) to key in his telephone number, which is stored and validated (59) and if determined to be invalid the caller is asked again (57) to key in his telephone number. When valid input is received the caller is asked to say their name, which is recorded (61) and the caller is then asked to hang up (63).

Turning to FIG. 7, the call-back operation will now be described.

Firstly, the call-back handler calls the client, i.e. the originally called party, and determines (71) whether the client answers. This call is placed by sending conventional public service telephone signals down a telephone line. The signals are interpreted by a switch, for example a public telephone exchange, a client PBX or ACD or a combination of the above to connect the call to the client as is known. If the client does not answer, whether there is no answer, the number is busy or unobtainable, a system alert is issued (73) and the call put in a virtual queue (75) for retry in a predetermined number of minutes (77).

If the client answers, then a message is played (79) to the client to indicate that the call-back handler is trying to place a call. The client may then accept the call or hang up; both are tested for in steps (81) or (83) respectively. If the client hangs up, the call is put into the virtual queue in the call-back handler (75) for retry in a predetermined number of minutes (77).

If the client accepts, a message is played (85) to the client to ask for the name that was stored in step (41) or (61) of the call-in process. Then, a call is made (87) to the caller. A test (89) then determines whether the call is answered; if it is the caller is connected (91) to the client. Otherwise, whether the caller does not answer, a busy signal is obtained or the number is unobtainable, the caller may be retried (93) in a predetermined number of minutes. The maximum number of retries may also be predetermined.

As will be appreciated, code to cause the call-back handler to carry out the above method steps may be provided in the call-back handler. The person skilled in the art will readily appreciate how to convert the flow diagrams and descriptions above into code to control the telephone cards and any other components of the call-back handler.

Of course, the skilled person will realise that a number of additional conventional steps may also be included, for example to terminate the process if one of the client or caller hangs up prematurely, or to cope with any other fault, warning or other situations that may arise.

Figure 8:
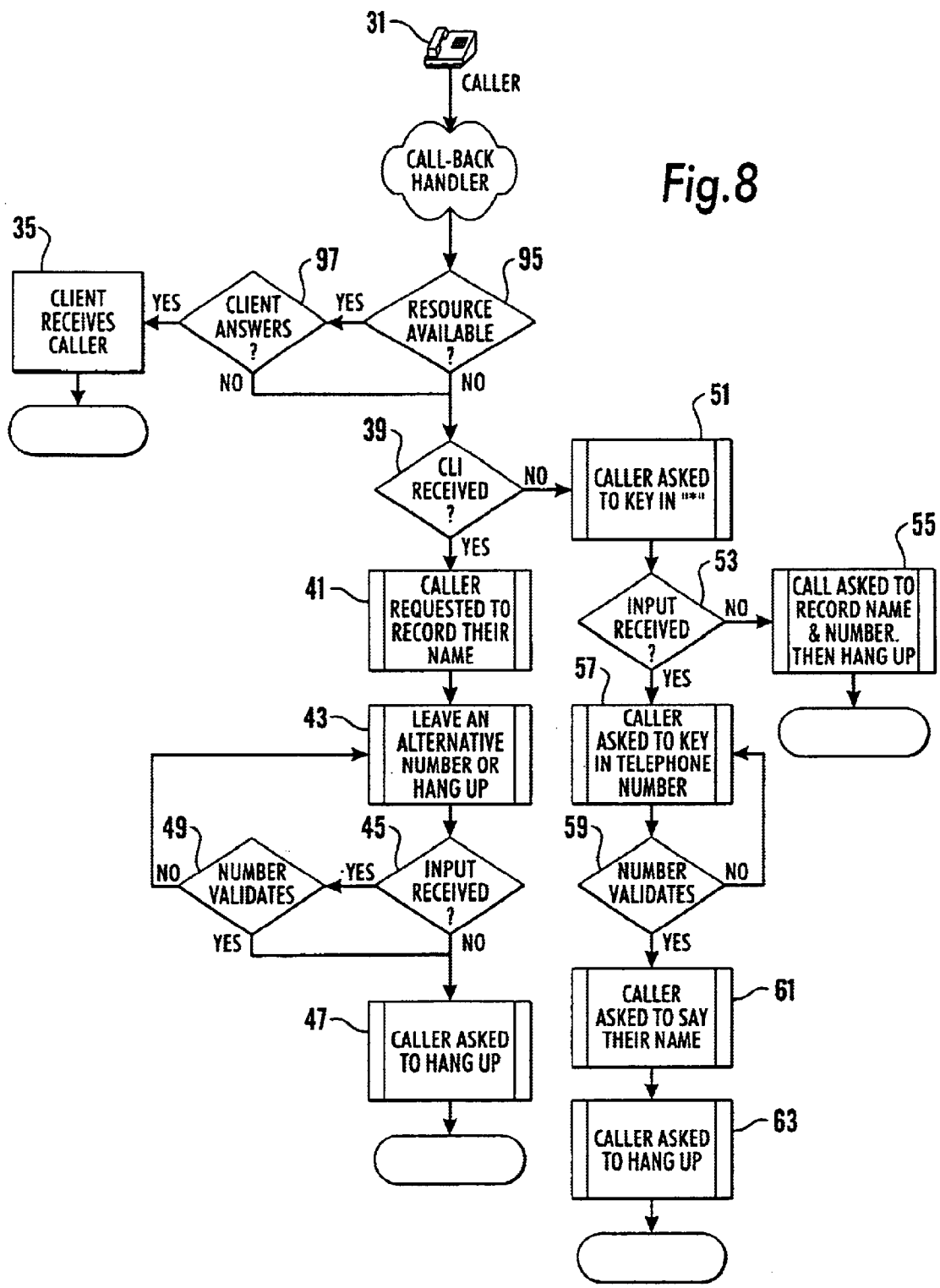
FIG. 8 is a flow diagram of a call-in process according to a further embodiment of the invention.

FIG. 8 is a flow chart of the call-in method for another specific embodiment of the invention, in this case for an "intercept all calls" type of operation. In this case, all calls arrive first at the call-back handler which first determines (95) whether client resource is available. This determination may be based on any number of factors, such as the time of day or the number of calls already in progress to the client. In addition, the call-back handler may communicate with the client by a network connection, for example over the internet.

If it is determined that the client has, or may have, resource available a call is placed (97) to the client by the call-back handler. If the client accepts the call, the call is directly connected (35) and the call-back process is not initiated. Otherwise, the call-in and call-back processes are carried out as already described with reference to FIGS. 5 and 6, starting by determining (37) whether the CLI is received.

It will be appreciated that the call-back handler may be located remotely of the client and connected only by means of public telephone connections to the client. This would allow the call-back facility to be provided as a separate service without requiring any installation of equipment at the call-centre premises. As an alternative, however, the call-back handler can be located on client premises or otherwise connected to the client by private telephone lines. This has the advantage that calls between the call-back handler and client would not normally be chargeable. Such an embodiment of the invention will now be described with reference to FIG. 9.

A central office switch (101) is connected to the national telephone network (103). The central office switch is connected both to a client PDX/ACD system (105) and to first and second (107,109) call-back handlers. All these connections are conventional public service telephone net connections (111). A number of client telephones (7) are connected to the PBX (105). The call-back handlers are also connected to the PBX by conventional telephone connections (111).

A network hub (113) connects the two call-back handlers (107,109) to each other, and to a call-back server (115). The call-back server (115) has a modem (117) to allow it to be dialled in directly for remote control, for example for servicing. Furthermore, the network hub is connected to a server (119) with a local area network (LAN) for connection with an internet connection. The internet connection thus connects the call-back handlers (107,109) through the network hub (113) and the server (119) to the client's extranet (121).

The above arrangements are by no means exclusive and a number of alternatives are envisaged.

The client may have a separate switch and ACD. However, in many arrangements a single switch will carry out both of these functions. Alternatively, the client need not have a switch at all, just one or more of a voice or data telephone connection, which may be an advanced digital subscriber line (ADSL), Integrated services digital network (ISDN), mobile or conventional, or any other known telephone connection.

Although no data link between call-back handler and client is required, it is foreseen that an electronic connection, for example by the internet or other LAN or extranet, is provided between the call-back handler and the agent (5). Such a link can be used for a number of purposes. In particular, the link can be used to provide additional information from the call-handler to the agent.

Alternatively, the link can be used to allow the switch to provide further information back to the call-back handler, such as the number of free agents.

Moreover, although in the above-described embodiments of the invention the calls are initiated in the out-dialler of the call-back apparatus, functionality may alternatively or preferably additionally be provided such that, after the client accepts the call, the client has the possibility to select the original caller to call back. This may be done using the telephone number pad or a keyboard connected to the client's telephone apparatus. In particular, in embodiments the client may dial the number of the original caller by dialling DTMP tones which may be interpreted by the call-back handler or simply passed through the call-back handler. This functionality is particularly useful for dealing with calls for which the call-back handler could not successfully use CLI/ANI and also could not record telephone key pad entries, but was able to record a voice message including the original caller's telephone number which may be replayed to the client.

The invention has now been described in detail for the purposes of clarity of understanding. However, it will be appreciated that certain changes and modifications may be made. Therefore, the scope and content of the invention should be determined in the light of the claims set forth below as well as the full range of equivalents to which those claims are entitled.

What is claimed is:

1. A call-back method for a call center environment, the method comprising receiving in a call-back handler a call from a caller to a client, the client having at least one agent capable of receiving telephone calls, determining a number at which the caller can be called back, initiating in the call-back handler a telephone call to the client through a public service telephone network standard line, waiting for the telephone call to be connected to the at least one agent, upon connection of the telephone call to the at least one agent and while the agent is available to talk to the caller, immediately initiating in the call-back handler a telephone call to the caller, and connecting together in the call-back handler the telephone calls to the caller and to the client with a resulting connection between the caller and the individual being routed through the call-back handler.

2. A method according to claim 1 wherein the call from the call-back handler to the client is over a public telephone network.

3. A method of handling calls made by a caller to a client according to claim 1 further comprising the step of determining if the client is able to accept the telephone call by making the individual available to talk to the caller without call-back, and if so connecting the caller to the client.

4. A method of handling calls according to claim 1, wherein the at least one agent is a plurality of agents, and wherein the client has a switch connecting the plurality of agents to an external telephone network.

5. A method according to claim 4 wherein a queue system is associated with the switch, and when the call-back system calls the client back it waits in the queue until an agent becomes available.

6. A method according to claim 1 wherein the call-back handler makes no more than a certain number of simultaneous calls to the client.

7. A method according to claim 6 wherein the certain number varies with time.

8. A method according to claim 6 further comprising the steps of sending information from the client to the call-back handler and determining the certain number based on the information sent.

9. A method according to claim 6 further comprising queuing calls that cannot be placed automatically with the client in a local queue in the call-back handler.

10. A method according to claim 1 further comprising the steps of allowing the caller to input a preferred call-back time, and determining when to call the caller back using this information, if provided.

11. A method according claim 1 including automatically determining a telephone number of the caller and initiating the call to the caller using the automatically determined telephone number.

12. A method according claim 1 further comprising the step of allowing a caller to input a different number to be called back on than the telephone number from which the caller is calling.

13. A method according to claim 1 comprising
receiving a call from a caller at a client's telephone system,
determining whether the call can be handled by the client or whether the call is to be handled by a call-back handler, and if the latter diverting the received call to the call-back handler to carry out the steps according to any preceding claim.

14. A method according to claim 1 wherein the call-back handler receives and sends calls by a direct connection to a central office switch.

15. A method for a call center environment of handling telephone calls from at least one caller to at least one predetermined telephone number of a client, the client having at least one agent capable of receiving telephone calls, the method including passing some or all telephone calls received on the at least one predetermined telephone number to a call-back handler to record the caller's number, receiving a telephone call to the client from the call-back handler on a telephone standard line by connecting the telephone call with the at least one agent, the agent being available to talk to the caller, wherein the received telephone call on the telephone standard line is connected to the caller, whilst the agent is available to talk to the caller, by the call-back handler immediately initiating and carrying out the steps of calling back the caller on the recorded number and connecting in the call-back handler the caller to the received telephone call.

16. A method according to claim 15 wherein telephone calls are passed to the call-back handler which cannot be handled locally within predetermined constraints.

17. The method of claim 15, wherein immediately initiating and carrying out the steps of calling back the caller on the recorded number and connecting in the call-back handler the caller to the received telephone call comprises carrying out the steps of calling back the caller on the recorded number and connecting in the call-back handler the caller to the received telephone call without waiting for the agent to press a key.

18. A call-back method for a call center environment, the method comprising receiving in a call-back handler a telephone call from an original caller to a client having telephone apparatus and at least one agent capable of receiving telephone calls, determining a number at which the original caller can be called back, calling the client telephone apparatus by transmitting a dial signal from the call-back handler to a switch, so that the switch interprets the dial signal to connect the call-back handler to the client telephone apparatus, upon establishing a connection between the call-back handler and the client telephone apparatus, immediately initiating in the call-back handler a telephone call from the call-back handler to the original caller, and connecting together in the call-back handler the telephone calls to the original caller and to the telephone apparatus of the client so that the original caller is connected to the client telephone apparatus through the call-back handler.

19. A call-back method according to claim 18 wherein the switch to which the telephone call to the client is transmitted is a public network telephone exchange.

20. A call-back method according to claim 19 wherein the public network telephone exchange is a central office switch.

21. A call-back method according to claim 18 wherein the switch to which the telephone call to the client is transmitted is a private branch exchange.

22. A call-back method according to claim 18 wherein the call-back handler waits for the telephone call to the client to be connected by the switch and for the client to answer the call, before initiating the call back to the original caller.

23. A call-back method according to claim 18 further comprising the step of determining if at least one agent is available to talk to the caller without call-back, and if so connecting the original caller to the client without entering the call-back procedure.

24. A method according to claim 18 including automatically determining in the call-back handler a telephone number of the original caller.

25. The call-back method of claim 18, wherein immediately initiating in the call back handler a telephone call from the call-back handler to the original caller comprises initiating the telephone call without waiting for the agent to press a key.

26. A call-back handler for handling telephone calls made by a caller to a client in a call center environment, wherein the call-back handler comprises a caller identification system for recording an identity of the caller, a telephone standard out-dialler for dialling out using telephone standard codes, code for causing the out-dialler to call the client and to wait for the telephone call to be connected to an agent, the agent being available to talk to the caller, code for causing the out-dialler, upon connection of the telephone call to the agent and while the agent is available to talk to the caller, to dial the caller immediately, and a switch for connecting the client with the caller so that the telephone calls from the out-dialler to the client and the caller are connected through the call-back handler.

27. A call-back handler according to claim 26 further comprising a queuing system for queuing telephone calls in the call-back-handler before dialling the client.

28. A call-back handler according to claim 26 further comprising an identifier to automatically determine the caller's identity.

29. A call-back handler system according to claim 26 wherein the call-back handler is connected directly to a central office switch.

30. The call-back method of claim 1, wherein immediately initiating in the call back handler a telephone call to the caller comprises initiating the telephone call without waiting for the agent to press a key.

31. The call-back handler of claim 26, further comprising code for causing the out-dialler to dial the caller without waiting for the agent to press a key.

* * * * *